United States Patent [19]

Pryor et al.

[11] 3,893,917
[45] July 8, 1975

[54] MOLTEN METAL FILTER
[75] Inventors: Michael J. Pryor, Woodbridge, Conn.; Thomas J. Gray, Halifax, Canada
[73] Assignee: Swiss Aluminium Limited, Chippis, Switzerland
[22] Filed: Jan. 2, 1974
[21] Appl. No.: 430,229

[52] U.S. Cl.................................. 210/69; 210/510
[51] Int. Cl............................................. B01d 23/02
[58] Field of Search .................. 210/65, 69, 71, 510

[56] References Cited
UNITED STATES PATENTS
3,006,473  10/1961  Gamber ................................ 210/69
3,654,150  4/1972  Eccles .................................. 210/69
3,747,765  7/1973  Nowak ............................ 210/510 X Primary Examiner—John Adee
Attorney, Agent, or Firm—Robert H. Bachman

[57] ABSTRACT

The present invention resides in an improved molten metal filter and a method of preparing same and a method of filtering molten metal therethrough. The filter is an open cell ceramic foam material having a plurality of interconnected voids surrounded by a web of said ceramic.

9 Claims, 2 Drawing Figures 3,893,917

MOLTEN METAL FILTER

BACKGROUND OF THE INVENTION

Molten aluminum in practice generally contains entrained solids which are deleterious to the final cast metal product. These entrained solids usually derive from three sources. Some are particles of aluminum oxide which are drawn into the liquid stream from the floating oxide layer on its surface, and some entrained particles are fragments of furnace lining, transfer trough and other portions of the molten aluminum handling equipment which are eroded and entrained in the flowing aluminum stream, and some particles are precipitates of insoluble impurities such as intermetallics, borides, carbides or precipitates of other aluminum compounds, such as chlorides. When these inclusions appear in the final cast product after the molten aluminum is solidified, they cause such final product to be less ductile or to have poor finishing characteristics. Accordingly, it is desirable to remove entrained solids from the molten aluminum stream before it is cast into a solid body which may be used as such or subjected to forming operations such as rolling, forging, extrusion, etc.

Filtering processes to remove entrained solids from liquids are accomplished by passing the solid-laden liquid through a porous filter medium that will not pass the solids. Filtering molten metal in general, and molten aluminum in particular, creates special problems because the liquid is so aggressive that it is difficult to find a filter medium capable of withstanding it.

In general, two methods of filtering are used for removing entrained solids from molten aluminum alloys before casting. The most common filter medium is an open weave glass cloth screen placed in the metal transfer trough, around the spout or even in the molten metal pool in the top of the solidifying ingot. These cloth screens are able to remove only the larger sizes of inclusions from the metal and are easily ruptured during use because the glass fibers become very weak at the temperature of molten aluminum. In another prior art procedure, molten aluminum is filtered through a bed of loose alumina particles, for example, of tabular alumina, but it often suffers from the drawbacks normally associated with bed filters in that it passes too many solids, there is a strong tendency to channeling which prevents efficient use, and pore size of the filter is not easily controlled but rather readily changes under conditions of use so that, even when originally of proper dimension, it cannot be efficiently maintained. In addition, the metal must be kept constantly molten when the filter is not in use.

Accordingly, it is a principal object of the present invention to provide an improved molten metal filter and a method for preparing same and also a method for filtering molten metal therethrough.

It is an additional object of the present invention to provide a filter and method as aforesaid which is inexpensive so that it may readily be used on a throw away basis.

A further object of the present invention is to obtain a filter and method as aforesaid which obtains high filtration efficiency.

Further objects and advantages of the present invention will appear hereinafter.

SUMMARY OF THE INVENTION

In accordance with the present invention it has now been found that the foregoing objects and advantages may be readily achieved.

The present invention provides a highly efficient method of filtering molten metal, especially aluminum, through a disposable filter characterized by being a ceramic foam material having an open cell structure with a plurality of interconnected voids surrounded by a web of said ceramic. The molten metal is poured through the ceramic foam material at a rate of from 5 to 500, and preferably 30 to 100, cubic inches per square inch of filter area per minute, thereby removing entrained solids from the molten metal. The filter of the present invention is prepared by:

A. providing an open cell, hydrophilic flexible organic foam material having a plurality of interconnected voids surrounded by a web of said material;

B. impregnating said material with an aqueous ceramic slurry so that said web is coated therewith and said voids are filled therewith;

C. compressing said material to expel from 25 to 75% of said slurry therefrom while leaving said web coated therewith;

D. releasing the compression so that the web remains coated with said slurry;

E. drying said material; and

F. heating the dried material to first burn out the flexible organic foam and then sinter the ceramic coating, thereby providing a fused ceramic foam having a plurality of interconnected voids surrounded by a web of fused ceramic in the configuration of said flexible foam.

Preferably after step (D) but before step (E) the slurry coated flexible foam is formed to the configuration required for filtration and retained in said formed configuration throughout the drying step (E) and heating step (F), with the forming restraint released following step (F).

In accordance with the present invention it has been found that it is possible to prepare low cost, porous, ceramic filtration media for molten metal, especially aluminum, having densities less than 30% of theoretical and in many cases only 5 to 10% of theoretical. The filter of the present invention represents an extremely efficient and low cost filter for use in filtering molten metal. With the extremely high ratios of available area for filtration at a controlled pore size, a given projected area of the filter media is inherently much less susceptible to clogging by nonmetallic particulate. Since the filters of the present invention are extremely inexpensive to prepare, it is quite feasible to use these filters on throw away basis.

DESCRIPTION OF DRAWINGS

The present invention will be more readily understood from a consideration of the following illustrative drawings in which.

Figure 1:
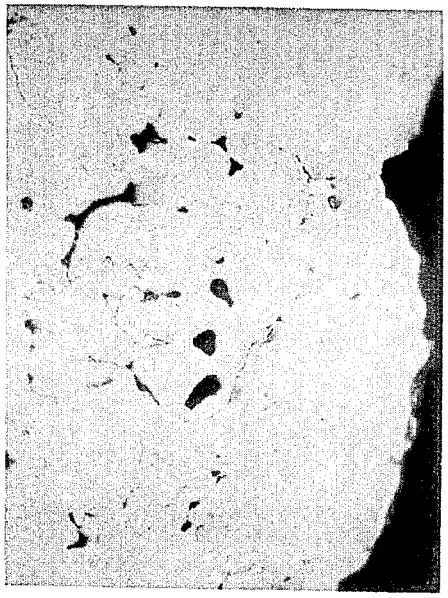
FIG. 1 is a photomicrograph at a magnification of 400× showing metal residue after filtration through the filter of the present invention and after passing the filtered metal through a pressure filter disc.

The photomicrographs will be discussed in more detail in the examples.

DETAILED DESCRIPTION

In accordance with the present invention the ceramic foam is prepared from an open cell, hydrophilic flexible foam material having a plurality of interconnected voids surrounded by a web of said flexible foam material. Typical material which may be used include the polymeric foams such as polyurethane foams, and the cellulosic foams. Generally, any combustible organic plastic foam may be used which has resilience and ability to recover its original shape. The foam must burn out or volatilize at below the firing temperature of the ceramic material which is employed. Also, one should use a foam material having from 5 to 100 pores per inch in order to provide the necessary filtration surface. The dimensions of the foam material may, of course, be varied depending upon the desired dimensions of the end filter material. Generally, one utilizes a foam material having a thickness of from ¼ to 4 inches, with from 1 to 2 inches being preferred.

The aqueous ceramic slurry which is employed depends naturally on the desired ceramic material for the chosen metal to be filtered. One must have sufficient properties in the final product to stand up to the particular molten metla with respect to chemical attack and structural and/or mechanical strength to stand up to the particular elevated temperature conditions. In addition, the slurry should have a relatively high degree of fluidity and be comprised of an aqueous suspension of the ceramic intended for use in the filter. Typical ceramic materials which may be employed include alumina, chromia, zirconia, magnesia, titanium dioxide, silica and mixtures thereof. For use with molten aluminum and its alloys, and alumina based slurry is quite satisfactory. For use an copper and its alloys, either zirconia or chromia are preferred. Normally, the slurry contains from about 10 to 40% water. Additives may be employed in the slurry such as binders.

The flexible foam material is then impregnated with the aqueous ceramic slurry so that the fiber-like webs are coated therewith and the voids are filled therewith. Normally, it is preferred to simply immerse the foam in the metal for a short period of time sufficient to insure complete impregnation of the foam.

The impregnated foam is then compressed to expel from 25 to 75% of the slurry while leaving the fiber-like web portion coated therewith. In a continuous operation one may pass the impregnated foam through a preset roller to effect the desired expulsion of slurry from the foam and leave the desired amount impregnated therein. Naturally, this may be done manually by simply squeezing the flexible foam material to the desired extent. At this stage the foam is still flexible and may be formed into configurations suitable for specific filtration tasks, i.e., into curved plates, hollow cylinders, etc. It is necessary to hold the formed foam in position by conventional means until the organic substrate is decomposed, or preferably until the ceramic is sintered. The impregnated foam is then dried by either air drying or accelerated drying at a temperature of from 100° to 700°C for from 15 minutes to 6 hours. Air drying may be achieved in from 8 to 24 hours. After drying, the material is heated at an elevated temperature to sinter the ceramic coating on the fiber-like webs. It is preferred to heat the dried impregnated material in two stages, with the first stage being to slowly heat to a temperature of from 350° to 700°C and hold within this temperature range for from 15 minutes to 6 hours in order to burn off or volatilize the web of flexible foam. Clearly this step can be part of the drying cycle, if desired. The second stage is to heat to a temperature of from 1200° to 1600°C and hold within said temperature range for from 15 minutes to 10 hours in order to sinter the ceramic. It is also preferred to control the heat up rates for each of these stages in order to avoid collapse of the ceramic material. Thus, the heat up rate from stage one is preferably less than 10°C per minute and the heat up rate in stage two is preferably less than 100°C per minute.

The resultant product is a fused ceramic foam having an open cell structure characterized by a plurality of interconnected voids surrounded by a web of said ceramic, with the ceramic foam material having a density of less than 30% of the theoretical density for a ceramic material of the same size. Naturally, the ceramic foam may have any desired configuration based on the configuration needed for the particular molten metal filtration process. Although, naturally, these configurations can be many and varied, semielliptical configuration is preferred for filtration in a transfer trough between the furnace and the casting mold in filtering molten aluminum. A hollow cylindrical configuration is preferred for filtering molten aluminum passing through a down spout. In either case, the height of the filtration media must exceed that of the molten metal to be filtered. It is a particular advantage of the filtration process of the present invention that excessive heads of molten metal are not required in order to start the filtration process utilizing the filter of the present invention.

In accordance with the present invention, the specific features thereof will be more readily understandable from a consideration of the following illustrative examples.

EXAMPLE I

A polyurethane foam material was provided having a thickness of ½ inch and containing 10 pores per inch. A ceramic slurry in water was provided containing 85% alumina, 15% chromia and 25% water. The foam material was immersed in the slurry and kneaded to remove air and fill the voids with the slurry and also to coat the fibrous webs of the foam with said slurry. The foam thus impregnated was removed from the slurry and subjected to compression to squeeze approximately 50% of the slurry out of the foam by passing the impregnated foam through preset rollers. The foam material sprung back to its original dimension after passing through the preset rollers and had the fibrous urethane filaments coated with a substantially uniform residue of the ceramic slurry.

Two samples were dried in the following manner. Sample A was air dried for 24 hours and Sample B was oven dried at 125°C for 1 hour.

Both dried samples were heated slowly at a heat up rate of 0.5°C per minute to 500°C to boil off the water and then to allow the polyurethane fibers to volatilize and/or burn out without collapsing the ceramic and without destroying the filamentary ceramic configuration. The foam was held at 500°C for one hour and was subsequently heated to 1350°C at a rate of 1°C per minute, held at 1350°C for 5 hours to permit the ceramic to sinter together and thereby provide an open cell ceramic foam material having a configuration of the original polyurethane foam material.

EXAMPLE II

Several ceramic foam materials were prepared in a manner after the procedure of Example I having the following configurations: 6 inches wide; 10 inches long and 1 inch thick. These materials were cemented into transfer troughs between the furnace and the casting mold for testing as a filter material for molten aluminum. Approximately 5,400 pounds of aluminum alloy 5252, containing from 2.2 – 2.8% magnesium, up to 0.08% silicon, up to 0.10% iron, up to 0.10% copper, and up to 0.10% manganese, were transferred through the filter at an average rate of about 80 cubic inches per square inch of filter per minute. It was surprising that a large head was not required to start the metal flow. Conventional rigid filtration media normally require a head of approximately 1 to 2 feet; whereas, a head of 2½ inches was required to start the metal flow in the process of the present invention.

Figure 2:
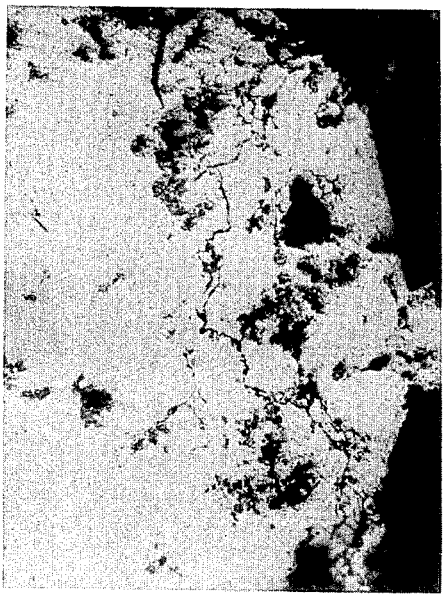
FIG. 2 is a photomicrograph at a magnification of 400× showing metal residue after filtration through a conventional tabular alumina bed filter and after passing the filtered metal through a pressure filter disc.

The filtration effect was excellent. FIG. 1 shows a cross-section of a pressure filter disc through which had been run aluminum alloy 5252 after filtration through a filter of Example I as shown in this Example II. FIG. 2 shows a similar filter disc through which had been passed the same volume of alloy 5252 which had previously been filtered through a commercial tabular alumina bed filter. The higher the residue in the filter disc shown in FIG. 1 and FIG. 2, the lower is the efficiency of the previous filter. It will be clearly seen that there is more residue in FIG. 2 than in FIG. 1, thereby indicating that the commercial tubular alumina bed filter is less efficient than the filter of the present invention.

The pressure filter test is a means of concentrating and examining the nonmetallic particulate in a 20–25 lb. sample of molten aluminum. To this end, molten metal is ladled carefully into a preheated 25 lb. clay graphite crucible into the base of which is set a 30 mm diameter, 3 mm thick porous silica disc plug. 90% of the metal is then forced through the disc by application of air pressure and the remaining metal solidified in situ. The disc and adjacent metal are then sectioned, polished, and examined by normal metallographic techniques to reveal the quantity of nonmetallics filtered out.

EXAMPLE III

A ceramic foam filter of the present invention was prepared in a manner after Example I having the configuration 3½ inches wide, 6 inches long and 1 inch thick. This filter was cemented into a transfer trough between the melting furnace and the casting mold. some 1800 lbs. of copper alloy 194, containing from 2.1 – 2.6% iron, from 0.05 – 0.20% zinc, from 0.01 – 0.04% phosphorus and balance essentially copper, were transferred through the filter at an average rate of 35 cubic inches per square inch of filter per minute. A head of 0.75 inch was all that was required to start metal flow through the filter of the present invention. Filtration was excellent and resulted in a 10% improvement in elongation of the cast metal over that of unfiltered metal. Tensile strength was not affected.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A low cost method of filtering molten metal through a disposable filter which comprises: providing a mass of molten metal; providing a ceramic foam material having an open cell structure characterized by a plurality of interconnected voids surrounded by a web of said ceramic, said ceramic foam material having a density of less than 30% of the theoretical density for a ceramic material of the same size, said ceramic foam material being formed by impregnating an open cell flexible organic foam having a plurality of interconnected voids surrounded by a web of said foam with an aqueous ceramic slurry so that the web is coated therewith and the voids are filled therewith, expelling slurry therefrom while leaving the web coated therewith, drying said coated foam and heating the dried coated foam to form said ceramic foam; and pouring said molten metal through said ceramic foam material at a rate of from 5 to 500 cubic inches per square inch of filter area per minute, thereby removing entrained solids from said molten metal.

2. A method according to claim 1 wherein said molten metal is aluminum or an aluminum base alloy.

3. A method according to claim 1 wherein said molten metal is copper or a copper base alloy.

4. A method according to claim 1 wherein said ceramic is selected from the group consisting of alumina, chromia, zirconia, magnesia, titanium dioxide, silica and mixtures thereof.

5. A method according to claim 1 wherein said ceramic foam material has a thickness of from ¼ to 4 inches.

6. A method according to claim 1 wherein said molten metal is poured through said ceramic foam material at a rate of from 30 to 100 cubic inches per square inch of filter area per minute.

7. A method according to claim 1 wherein said ceramic foam material is placed in a transfer trough between a furnace and a casting mold.

8. A method according to claim 1 wherein said ceramic foam material is placed in a downspout.

9. A method according to claim 1 wherein said ceramic foam material is prepared by heating said dried coated foam to burn off the web of flexible foam and to sinter the ceramic coating.

* * * * *

UNITED STATES PATENT AND TRADEMARK OFFICE
CERTIFICATE OF CORRECTION

PATENT NO. : 3,893,917
DATED : July 8, 1975
INVENTOR(S) : Michael J. Pryor and Thomas J. Gray It is certified that error appears in the above–identified patent and that said Letters Patent are hereby corrected as shown below:

In Column 3, line 27, the word "metla" should read ---metal---;

In Column 3, line 36, the word "and", second occurrence, should read ---an---;

In Column 3, line 37, the word "an" should read ---with---;

In Column 3, line 45, the word "metal" should read ---slurry---.

In Column 5, line 33, the word "tubular" should read ---tabular---;

In Column 5, line 54, the word "some" should read ---Some---.

Signed and Sealed this second Day of December 1975

[SEAL]

Attest:

RUTH C. MASON
Attesting Officer

C. MARSHALL DANN
Commissioner of Patents and Trademarks